J. R. Floyd,
Burglar-Proof Safe.
No. 1,311. Reissued May 27, 1862.
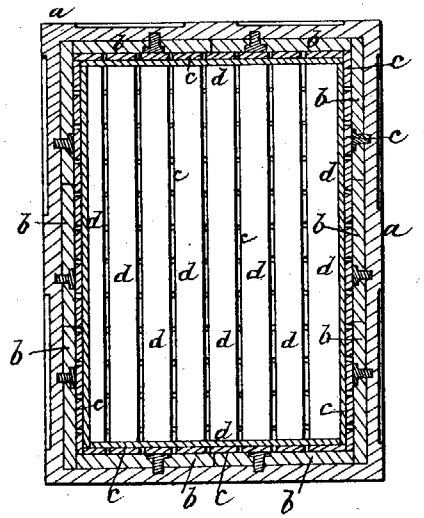
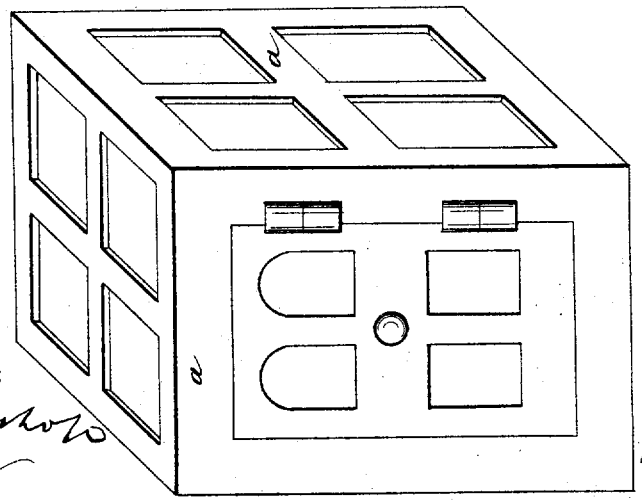
Witnesses:
Wm H Bishop
A. DeLacy
Inventor:
James R. Floyd
AM. PHOTO-LITHO. CO. N.Y. (OSBORNE'S PROCESS.)

UNITED STATES PATENT OFFICE.

JAMES R. FLOYD, OF NEW YORK, N. Y.

IMPROVEMENT IN BURGLAR-PROOF SAFES.

Specification forming part of Letters Patent No. 30,398, dated October 16, 1860; Reissue No. 1,311, dated May 27, 1862.

*To all whom it may concern:*

Be it known that I, JAMES R. FLOYD, of the city, county, and State of New York, have invented a new and useful Improvement in Burglar-Proof Safes; and I do hereby declare that the following is a full, clear, and exact description thereof, reference being had to the accompanying drawings, making a part of this specification, in which—

Figure 1 is a perspective view of a safe on my improved plan, and Fig. 2 a vertical section thereof.

The same letters indicate like parts in both figures.

The object of my invention is to render safes proof against the action of all known cutting, abrading, or drilling tools, so as to obtain security against all attempts to get inside by either cutting, drilling, or filing. Many attempts have been made to attain this result by the use of chilled cast-iron and of hardened steel, but without success.

I have discovered, and by the test of experiment proved, that the metal obtained from the smelting of the "franklinite ore," extensively found in the State of New Jersey, and which is known to consist mainly of iron and zinc, when cast, is of a crystalline structure, and of a diamond-like hardness, which cannot be affected in the slightest degree by any of the means heretofore resorted to for cutting, drilling, filing, or otherwise affecting chilled cast-iron and hardened steel, and that if this metal in the cast or crystalline state be properly applied in the construction of safes it will afford perfect protection against any of the means of access known and heretofore practiced by burglars.

In the accompanying drawings, *a* represents the external shell of a safe of the usual construction, and made of wrought-iron. To the inside of this shell I secure plates *b*, cast of the metal obtained from the franklinite ore above named, the said plates being cast with holes for the bolts by which the plates are secured, in the manner represented, or in any other suitable manner, taking care to extend such lining throughout the entire safe, including the door; and inside of this lining I put another lining, consisting of series of spring-steel bars *c*, and *d*, placed so as to cross each other. The edges of these bars are placed very near, but not to touch. The object of putting the spring-steel bars inside is in case holes should be drilled through the wrought-iron outer case, and an attempt should be made by a punch to break the franklinite lining, in such case the inner lining of spring steel will give sufficient support to prevent such breaking.

If desired to be fire-proof as well as burglar-proof, provision may be made for the usual fire-proof filling.

I have so far described the mode of construction which I have adopted and prefer; but I wish it to be understood that I do not limit my claim of invention to such mode of construction, as other modes of construction may be adopted involving my discovery or invention.

Instead of placing the plates of franklinite metal between the wrought-iron shell and the steel bars, they may be placed between an outer and an inner shell of wrought iron, or the safe may be made without anything inside of the franklinite metal. Another mode of application which I have contemplated is to cast a shell in one piece of this franklinite metal, leaving an opening for the door, which is to be cast separate, and then building around and securing to these an outer shell of wrought-iron or other metal, leaving, if desired, sufficient space between for the fire-proof composition, if such is required to be used; and if security against breakage by sledges, jack-screws, &c., be not necessary, an outer shell, or parts thereof, may be made of cast-iron, or the entire case and door may be made of this franklinite metal, in which case it must either be cast with suitable bolt-holes or other means to effect the fastening of the appendages, or so much other metal must be secured to it or made to embrace the edges thereof as will admit of attaching the fastening, such as hinges for the doors, &c.

Doors or covers for vaults may be made on the plan of my said invention.

From the foregoing description of the various modes in which I have contemplated the application of my said invention, it will be readily seen that my said invention is not limited to any special mode of construction; but that

What I claim as new, and desire to secure by Letters Patent, consists—

In the use or introduction of the crystallized or cast franklinite, or similarly constituted metal by whatever name known, in the construction of safes or parts thereof to render such structures proof against the use of all kinds of known cutting-tools.

JAMES R. FLOYD.

Witnesses:
WM. H. BISHOP.
A. DE LACY.